(12) United States Patent
Fujimoto

(10) Patent No.: US 6,907,783 B2
(45) Date of Patent: Jun. 21, 2005

(54) VIBRATING GYROSCOPE AND ANGULAR VELOCITY SENSOR

(75) Inventor: Katsumi Fujimoto, Toyama-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/660,563

(22) Filed: Sep. 12, 2003

(65) Prior Publication Data

US 2004/0079153 A1 Apr. 29, 2004

(30) Foreign Application Priority Data

Oct. 28, 2002 (JP) ........................................ 2002-312408

(51) Int. Cl.⁷ ................................................ G01P 9/04
(52) U.S. Cl. .................................. 73/504.14; 73/504.12
(58) Field of Search ........................ 73/504.12, 504.14, 73/504.16; 310/329

(56) References Cited

U.S. PATENT DOCUMENTS 6,281,618 B1 * 8/2001 Ishitoko et al. ............. 310/329

2001/0010169 A1  8/2001  Watarai

FOREIGN PATENT DOCUMENTS

| EP | 0 751 374 A2 | 1/1997 |
| EP | 0 955 519 A2 | 11/1999 |
| JP | 08-292033 | 11/1996 |
| JP | 10-307029 | 11/1998 |
| JP | 2000-304546 | 11/2000 |
| WO | WO 93/00589 | 1/1997 |

* cited by examiner

Primary Examiner—John E. Chapman
(74) Attorney, Agent, or Firm—Keating & Bennett, LLP

(57) ABSTRACT

A vibrating gyroscope includes a vibrator having a pair of vibrating bodies, both end portions in the longitudinal direction of which are fixed together in the thickness direction by intermediate parts and the vibrator is supported such that a secondary bending vibration with both ends free in the thickness direction of the vibrating bodies can be performed. The vibrating gyroscope also includes a driver for causing the vibrating bodies to perform buckling vibrations in opposite directions, and a detector for detecting the magnitude of the secondary bending vibration of the vibrator. The resonance frequency of the secondary bending vibration is close to the frequency of the buckling vibrations.

20 Claims, 18 Drawing Sheets

VIBRATING GYROSCOPE AND ANGULAR VELOCITY SENSOR

BACKGROUND OF THE INVENTION

1. Field of the Invention

The present invention relates to a vibrating gyroscope and angular velocity sensor, and more particularly, to the construction of a vibrating gyroscope having a greatly reduced height, and to the construction of an angular velocity sensor having the vibrating gyroscope.

2. Description of the Related Art

Up to now, in navigation systems and car body control systems used in cars, since it is required to confirm the yaw direction of a car, that is, the turning direction of the body of the car, a rotational angular velocity about the vertical axis perpendicular to the traveling surface (ground) is detected. To detect the rotational angular velocity, an angular velocity sensor equipped with a vibrating gyroscope is utilized, and such a vibrating gyroscope generally contains a pole or tuning-fork vibrator (see Japanese Unexamined Patent Application Publication No. 8-292033 and Japanese Unexamined Patent Application Publication No. 10-307029).

Furthermore, the angular velocity sensor equipped with a vibrating gyroscope for detecting a rotational angular velocity is also utilized for correcting video camera vibrations due to hand vibration, and, rotational angular velocities about two axes perpendicular to each other on the plane parallel to the CCD surface are detected by vibrating gyroscopes.

The above-described angular velocity sensor of the related art is generally disposed inside a car so as to be parallel to the traveling surface, and accordingly, the mounting plate on which the vibrating gyroscope is mounted is also disposed to be parallel to the traveling surface. On the other hand, a pole or tuning-fork vibrator with which the vibrating gyroscope is equipped can detect the rotational angular velocity acting around an axis (detection axis) that is parallel to the longitudinal direction of the vibrator.

Accordingly, when the vibrating gyroscope according to the related art is mounted on the mounting plate disposed parallel to the traveling surface, it is required to mount the vibrator such that the longitudinal direction of the vibrator is perpendicular to the mounting plate. However, when constructed in this way, there is a problem in that only the vibrating gyroscope equipped with a vibrator with a large length protrudes more than other parts on the mounting. Moreover, it can be also considered to reduce the overall length of the vibrator in the longitudinal direction. However, if the overall length of the vibrator is reduced, since the resonance frequency increases and the sensitivity and SN ratio are deteriorated, it becomes impossible to detect the rotational angular velocity with a high degree of precision.

Furthermore, when involuntary movements of a person's hands during use of a video camera are corrected by using the vibrating gyroscope according to the related art, if the mounting surface of the main board is perpendicular to the CCD surface, since the longitudinal direction of a vibrator with which the vibrating gyroscope is equipped is required to be perpendicular to the main board of the camera, the vibrating gyroscope protrudes more than other parts. Moreover, although it has been considered to make a board on which the vibrating gyroscope is mounted separated from the main board and to make wiring connections by using a flexible printed circuit board, etc., such a construction increases the number of parts and becomes complicated, and as a result, an increase in cost is inevitable.

SUMMARY OF THE INVENTION

In order to solve the problems described above, preferred embodiments of the present invention provide a vibrating gyroscope constructed so as to have reduced height and an angular velocity sensor including the vibrating gyroscope.

A vibrating gyroscope according to a preferred embodiment of the present invention includes a vibrator including a pair of vibrating bodies, each having a substantially rectangular plate shape, in which both end portions in the longitudinal direction are fixed together in the width direction by intermediate elements and the vibrator constructed such that a secondary bending vibration with both ends free in the thickness direction of the vibrating bodies can be generated, a driver that is operative to cause the vibrating bodies to generate buckling vibrations in opposite directions to each other, and a detector detecting the magnitude of the secondary bending vibration of the vibrator. In the vibrating gyroscope, the resonance frequency of the secondary bending vibration is preferably close to the frequency of the buckling vibrations.

It is also preferred that three nodal points of the secondary bending vibration exist along the longitudinal direction of the vibrator and, out of the three nodal points, the vibrator is supported at the two nodal points located at the ends of the vibrator.

The vibrating bodies may be arranged in a unimorph construction or a bimorph construction.

It is also preferred that electrodes are disposed on the outside surface of each of the vibrating bodies so as to be disposed opposite to each other with the vibrator disposed therebetween, and the magnitude of the secondary bending vibration is detected through the electrodes.

Alternatively, a pair of electrodes are preferably disposed on the outside surface of one of the vibrating bodies so as to be separated from each other in the longitudinal direction and an additional electrode is disposed along substantially an entire length of the vibrator on the outside surface of another of the vibrating bodies and opposite to the pair of electrodes, and the magnitude of the secondary bending vibration is detected through the electrodes.

In another preferred embodiment, electrodes are disposed along substantially an entire length of the vibrator on the outside surface of each of the vibrating bodies so as to be opposite to each other with the vibrator disposed therebetween, and the magnitude of the secondary bending vibration is detected through the electrodes.

According to yet another preferred embodiment, an angular velocity sensor includes a plurality, for example, three, vibrating gyroscopes provided on the same plane. In the angular velocity sensor, a vibrating gyroscope for detecting a rotating angular velocity having a vertical axis perpendicular to the plane as a rotating axis is a vibrating gyroscope according to a preferred embodiment of the present invention.

Other features, elements, characteristics and advantages of the present invention will become more apparent from the following detailed description of preferred embodiments thereof with reference to the attached drawings.

DETAILED DESCRIPTION OF PREFERRED EMBODIMENTS

First Preferred Embodiment

Figure 1:
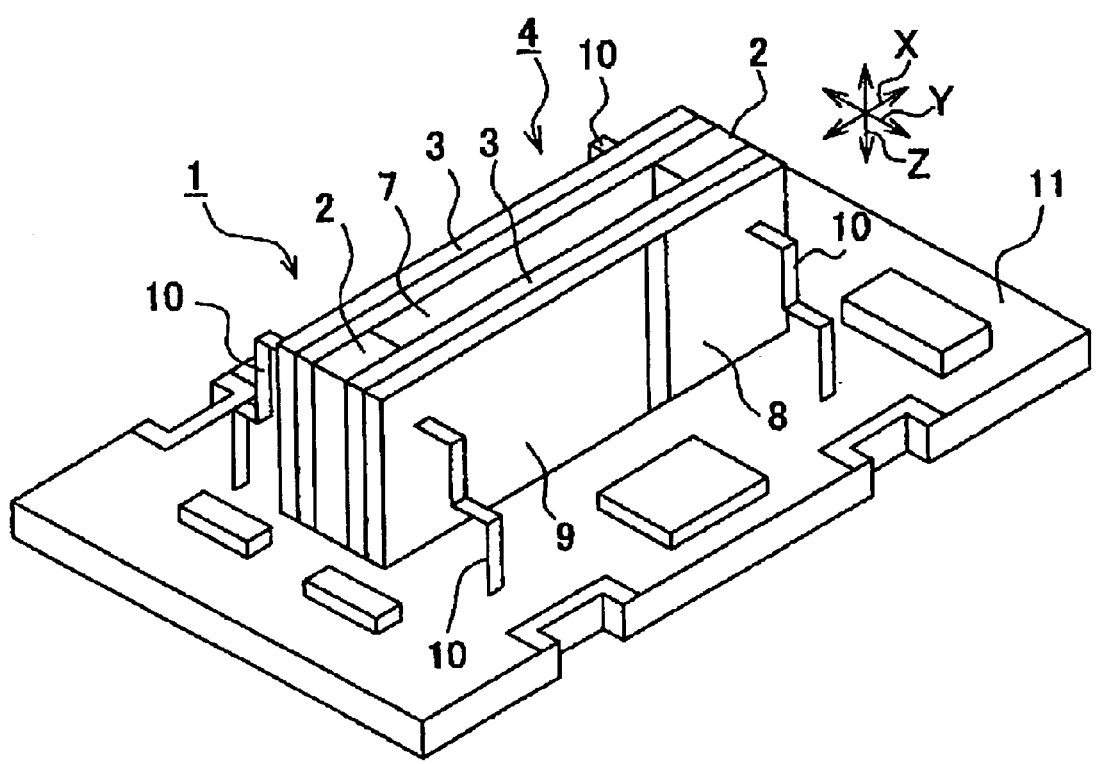
FIG. 1 is a perspective view showing the whole construction of a vibrating gyroscope according to a first preferred embodiment of the present invention.
Figure 2:
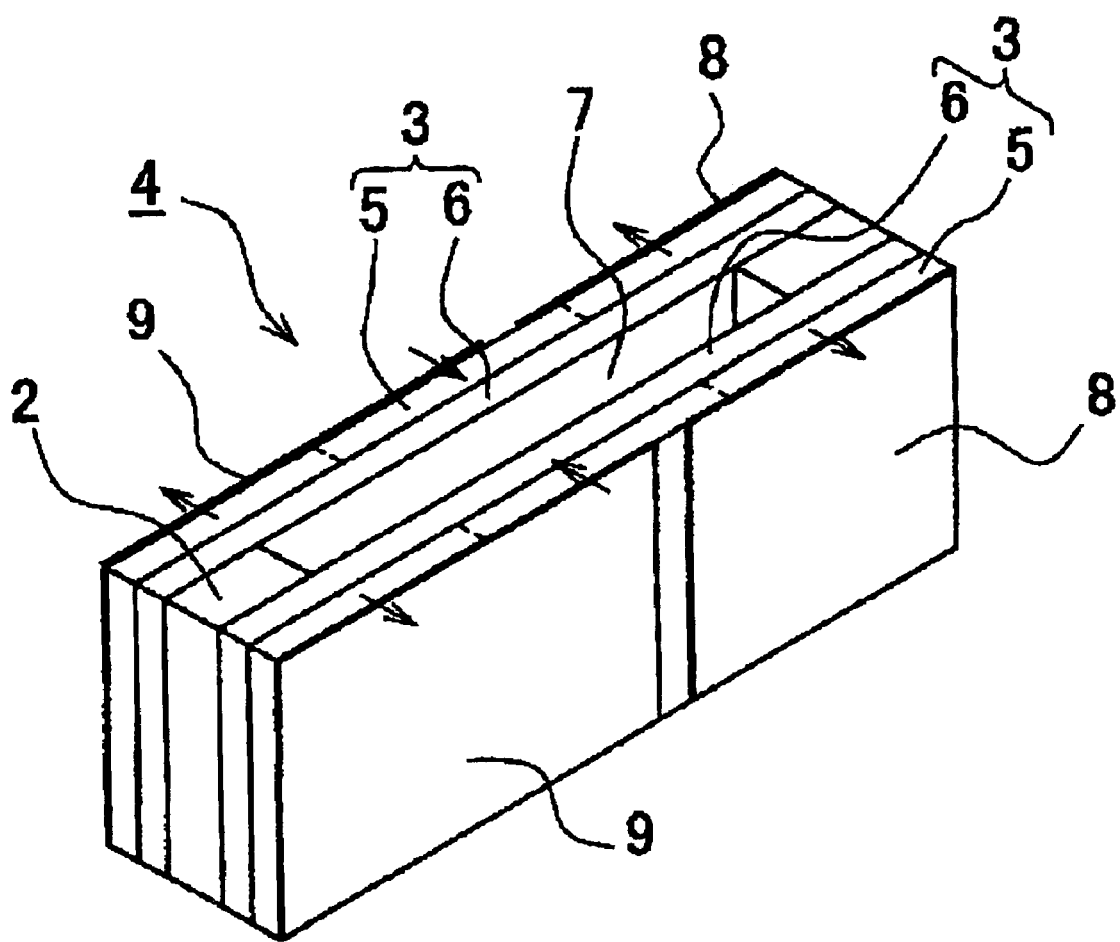
FIG. 2 is a perspective view showing the whole construction of a vibrator with which the vibrating gyroscope of the first preferred embodiment is equipped.
Figure 3:
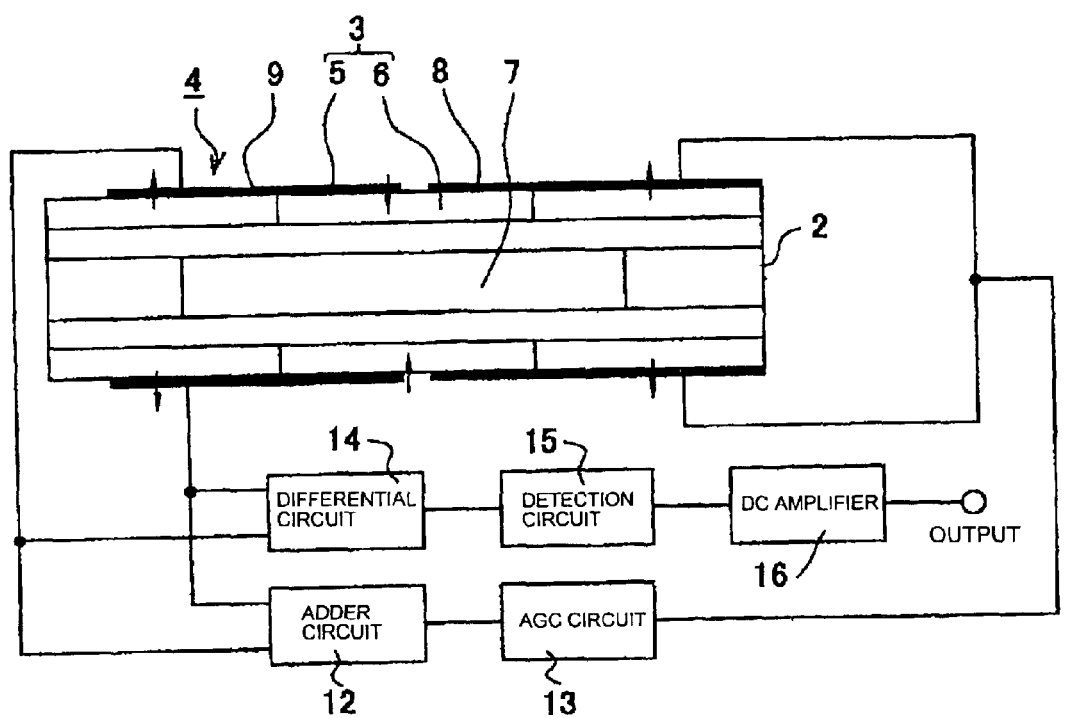
FIG. 3 shows the construction of essential parts of the vibrating gyroscope of the first preferred embodiment, including a drive detection circuit.
Figure 4A:
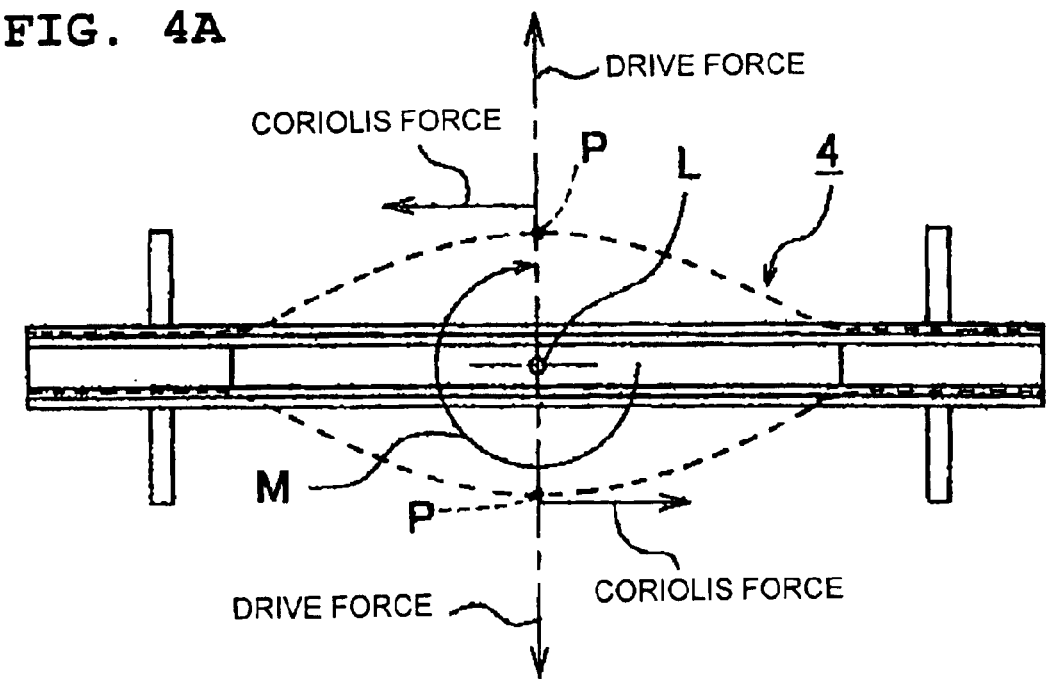
FIGS. 4A to 4C are schematic top views for describing the operation of the vibrating gyroscope of the first preferred embodiment of the present invention.
Figure 4B:
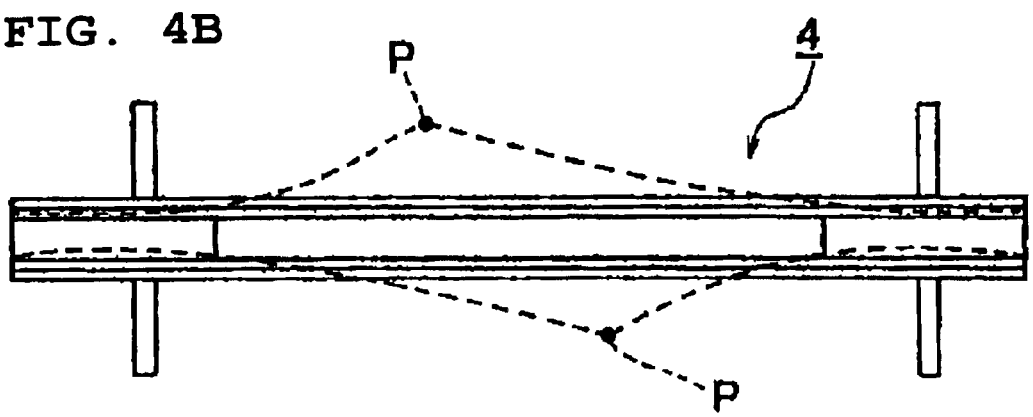
Figure 4C:
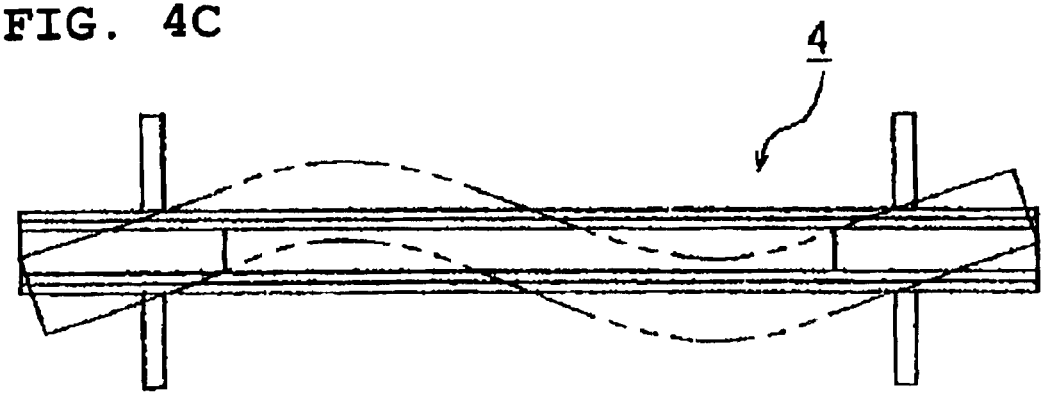
Figure 5:
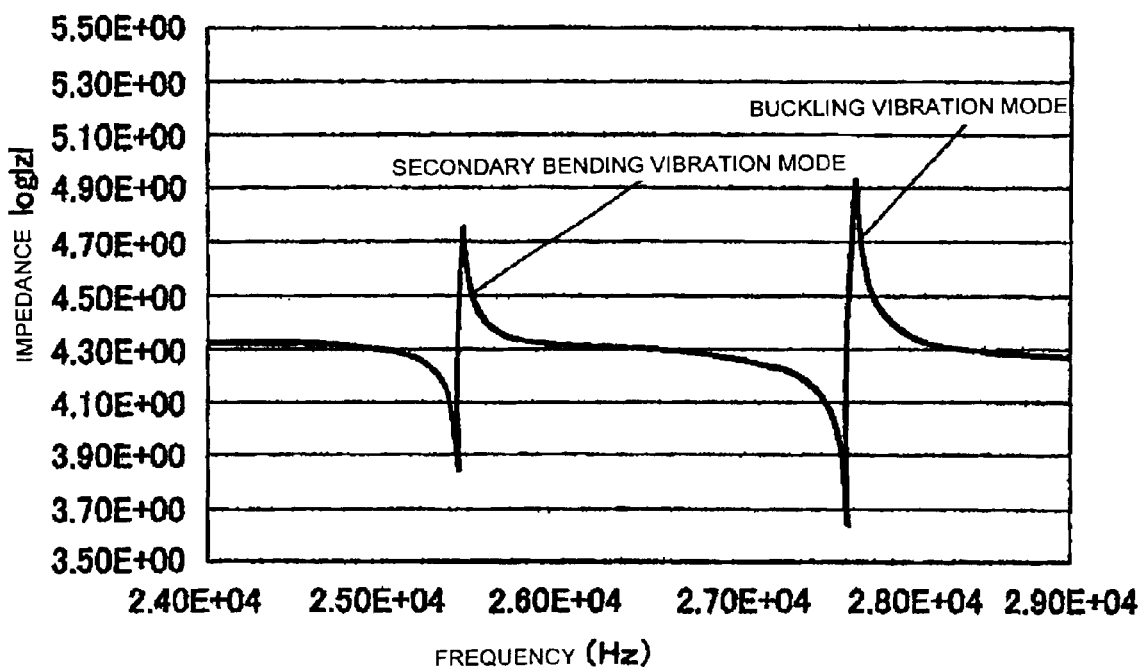
FIG. 5 shows the relationship between the frequency of a buckling vibration and the resonance frequency of a secondary bending vibration in the vibrator.

FIG. 1 is a perspective view showing the whole construction of a vibrating gyroscope according to a first preferred embodiment of the present invention, FIG. 2 is a perspective view showing the whole construction of a vibrator with which the vibrating gyroscope is equipped, and FIG. 3 is a schematic illustration showing the construction of essential parts of the vibrating gyroscope including a drive detection circuit. FIGS. 4A to 4C are top views diagrammatically showing the operation of the vibrating gyroscope, and FIG. 5 shows the relationship between the resonance frequency of a buckling vibration and the resonance frequency of a secondary bending vibration.

Furthermore, FIGS. 6 to 10 show the construction of first to fourth modified examples of the vibrating gyroscope according to the first preferred embodiment. Moreover, FIG. 11 shows the construction of essential parts of an angular velocity sensor constructed by using the vibrating gyroscope according to the first preferred embodiment of the present invention.

A vibrating gyroscope 1 according to the first preferred embodiment is, as shown in FIG. 1, equipped with a vibrator 4 including a pair of vibrating bodies 3, each preferably having a substantially rectangular plate shape, in which both end portions in the longitudinal direction X are fixed by intermediate metal parts 2 and the middle portions are arranged so as to face each other. As shown in FIG. 2, each of the vibrating bodies 3 has a unimorph construction in which a piezoelectric ceramic plate 5 whose polarization direction is reversed in substantially each one third along the longitudinal direction X and a flat metal plate 6 are joined so as to face each other, and the piezoelectric ceramic plates 5 are each disposed at the outer sides of the vibrator 4.

Both end portions in the longitudinal direction X of the vibrating bodies 3 constituting the vibrator 4 are fixed to each other by the intermediate parts 2, and an empty portion or gap 7 where buckling vibrations of the vibrating bodies 3 can be made opposite to each other in the thickness direction Y of the vibrating bodies 3 is provided between the middle portions of the flat metal plates 6 disposed at the inner sides of the vibrator 4. Furthermore, a drive electrode 8 and a detection electrode 9 are disposed on the outside surface of the piezoelectric ceramic plate 5 constituting each vibrating body 3 such that the drive electrode 8 and the detection electrode 9 are separated at one end and the other end in the longitudinal direction X.

Furthermore, the vibrator 4 including the pair of vibrating bodies 3 arranged so as to be opposite to each other is constructed such that the entire device can make a secondary bending vibration with both ends movable in the thickness direction Y of the vibrating bodies 3. More specifically, of the three nodal points of the secondary bending vibration existing along the longitudinal direction X, the vicinities of the nodal points located at both end portions are supported by a pair of conductive supporting parts 10 having spring action, that is, a total of four supporting parts 10. The resonance frequency of the secondary bending vibration is close to the frequency of the buckling vibration.

That is, the vibrator 4 is supported by the supporting parts 10 such that the width direction Z of each of the vibrating bodies 3, that is, the direction along an axis passing through the empty portion or gap 7, is substantially perpendicular to the surface of a mounting board 11 and that the lower edge is raised slightly from the surface of the mounting board 11. Moreover, these supporting parts 10 define the connection between the drive electrodes 8 and detection electrodes 9 and the driver and detector (to be described later). Both end portions of the vibrator 4 may simply be sandwiched and supported so as to be conductive or may be joined by using soldering or conductive adhesive so as to be conductive.

Moreover, as shown in the circuit construction in FIG. 3, an adder circuit 12 and automatic gain control (AGC) circuit, which make the vibrating bodies 3 have buckling vibrations opposite to each other and which function as a driver for the vibrator 4, and a differential circuit 14, a detection circuit 15, and a direct current (DC) amplifier 16, which function as a detector for detecting the magnitude of a secondary bending vibration, are provided on the surface of the mounting body 11. While the AGC circuit 13 functioning as a driver connected to the drive electrode 8 of each vibrating body 3 constitutes a self-oscillation circuit, the adder circuit 12 and differential circuit 14 are each connected to the detection circuit 9 of each of the vibrating bodies 3 arranged so as to face each other, and a signal in accordance with the magnitude of the detected secondary bending vibration is output from the DC amplifier 16.

Moreover, in the vibrator 4 made of the vibrating bodies 3 having a unimorph construction, middle electrodes (not illustrated) of each of the vibrating bodies 3 in contact with the intermediate parts 2 are required to have the same electric potential. Both middle electrodes may be connected to a reference electric potential.

Next, the operation of the vibrating gyroscope 1 according to the present preferred embodiment will be described. First, in the vibrating gyroscope 1 having the above-described unique construction, the vibrating bodies 3 constituting the vibrator 4 are made to have buckling vibrations opposite to each other. Under such a condition, when a rotational angular velocity M is applied about an axis that is substantially parallel to the width direction Z of each of the vibrating bodies 3 of the vibrator 4 when buckling vibrations take place, for example, an axis (detection axis) L passing through the empty portion 7 of the vibrator 4, the vibrator 4 starts to vibrate such that a secondary bending vibration with both ends free takes place in the thickness direction Y of each of the vibrating bodies 3.

That is, since the rotational angular velocity M is applied to each of the vibrating bodies 3 where buckling vibrations take place, a Coriolis force appears. Then, the Coriolis force is applied to each of the vibrating bodies 3 in the direction that is substantially perpendicular to the drive force of the buckling vibrations, that is, in the directions that are substantially parallel to the longitudinal direction of the vibrating bodies 3, but in directions opposite to each other.

Accordingly, as shown in FIG. 4B, the peak points P of the buckling vibrations in each vibrating body 3 are displaced in the direction opposite to each other and the vibrating shape of the vibrator 4 where buckling vibrations take place is deformed due to the effect of the Coriolis force. The location of the center of gravity of the vibrator 4 is unbalanced with regard to the longitudinal direction and thickness direction of each vibrating body 3. In this vibrator 4, since the resonance frequency of the secondary bending vibration is close to the frequency of the buckling vibration, a vibration in the secondary bending vibration mode is excited in the vibrator 4 which is deformed under the influence of the Coriolis force, as shown in FIG. 4C.

As a result, a signal due to the buckling vibration and a signal due to the secondary bending vibration are output from the detection electrode 9 of each of the vibrating bodies 3 disposed so as to face each other. Then, since the polarization directions and bending directions of the piezoelectric ceramic plates 5 in the vibrating bodies 3 are the same as each other, the signals produced by the buckling vibrations have the same phase. On the other hand, the signals due to the secondary bending vibrations become opposite in phase to each other, because the polarization directions are the same, but the bending directions are opposite to each other.

Then, when opposite-phase components of signals due to secondary bending vibrations output from the detection electrodes 9 of the vibrating bodies 3 are detected by the differential circuit 14 constituting the detector, the magnitude, that is, of a Coriolis force, appearing with the application of a rotational angular velocity M around the detection axis L can be determined. As a result, the magnitude of the rotational angular velocity M applied about the axis along the width direction Z of each of the vibrating bodies 3 constituting the vibrator 4 with which the vibrating gyroscope 1 arranged so as to be substantially parallel to the surface of the mounting board 11 is equipped, that is, around the vertical axis that is substantially perpendicular to the mounting surface can be determined.

Moreover, the detection signals output from the detection electrodes 9 of the vibrating bodies 3 are added in the adder circuit 12 constituting the driver. Then, the added detection signals are fed back to the vibrator 4 through the AGC circuit 13.

The relationship between the resonance frequency of buckling vibrations and the resonance frequency of secondary bending vibrations in the resonator 4 according to the present preferred embodiment is as shown in FIG. 5. Although the buckling vibration mode of each vibrating body 3 constituting the vibrator 4 is affected by the length, along the longitudinal direction X, of the empty portion 7, the secondary bending vibration mode of the vibrator 4 itself is not affected by the length, along the longitudinal direction X, of the vibrator 4. When the resonance frequencies of the buckling vibrations and secondary bending vibrations in the resonator 4 are required to be close to each other, the resonance frequency of the secondary bending vibrations is close to the resonance frequency of the buckling vibrations such that the resonance frequency of the secondary bending vibrations is increased by trimming both end portions in the longitudinal direction of the vibrator 4 to reduce the total length.

Figure 6:
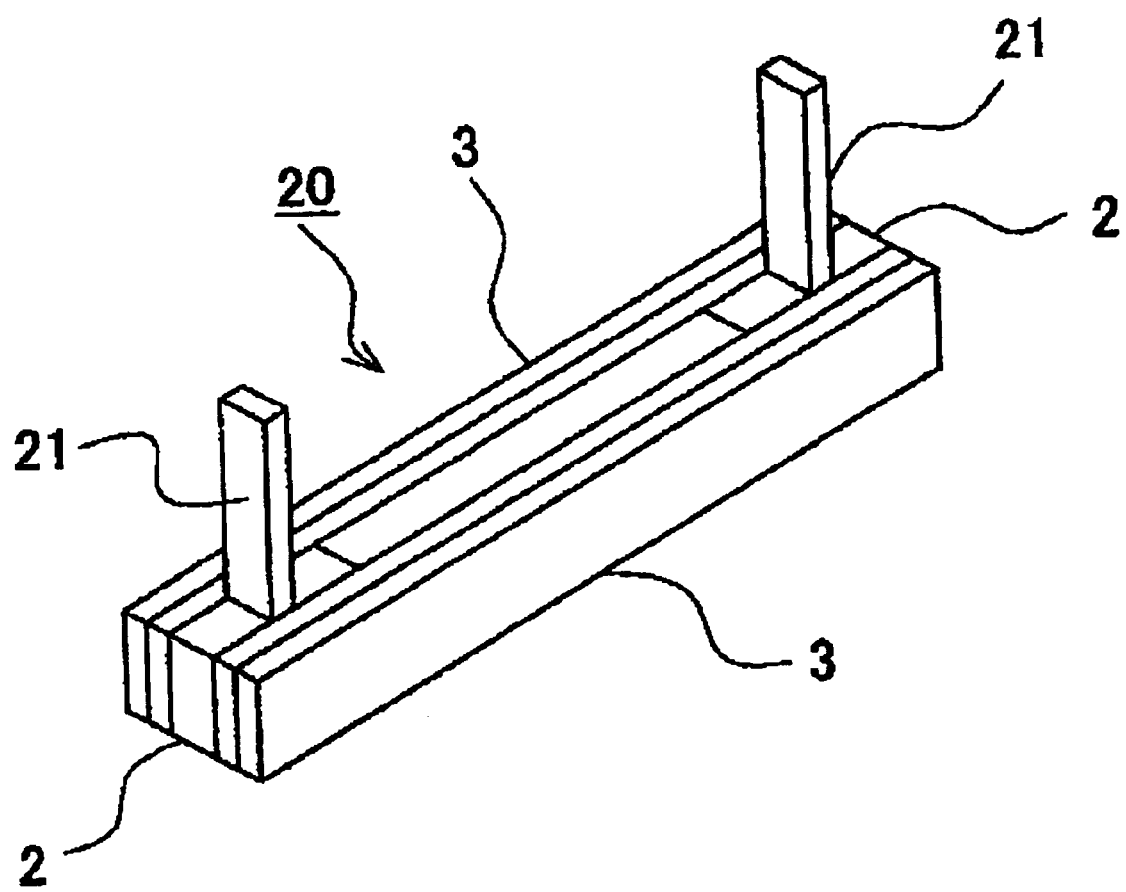
FIG. 6 is a perspective view showing a first modified example of the vibrator of the first preferred embodiment of the present invention.

Furthermore, it goes without saying that the vibrating gyroscope according to the present preferred embodiment is not limited to the above-described construction and may have various first to fourth constructions as described below. First of all, in a vibrator 20 constructed as a first modified example, as shown in FIG. 6, conductive support pins 21 are extended from the intermediate parts 2 placed between the end portions of the vibrating bodies 3 and the vibrator 20 is turned over to stand upright without using the support parts 10, but by using the support pins 21. When constructed in this way, the intermediate electrodes of the vibrating bodies 3 can be made a reference electric potential through the support pin 21.

Moreover, in the piezoelectric ceramic plate 5 of each vibrating body 3 in the present preferred embodiment, the polarization direction is reversed in each area occupying substantially one third, and the drive electrode 8 and the drive electrode 9 are disposed on the outside surface so as to be separated from each other. However, as in a vibrator 22 constructed as a second modified example, which is shown in FIG. 7A, on the outside surface of the piezoelectric ceramic plates 5 in which the polarization direction is reversed in each area occupying substantially one third, full-length electrodes 23 may be formed as drive electrodes or detection electrodes.

Figure 7A:
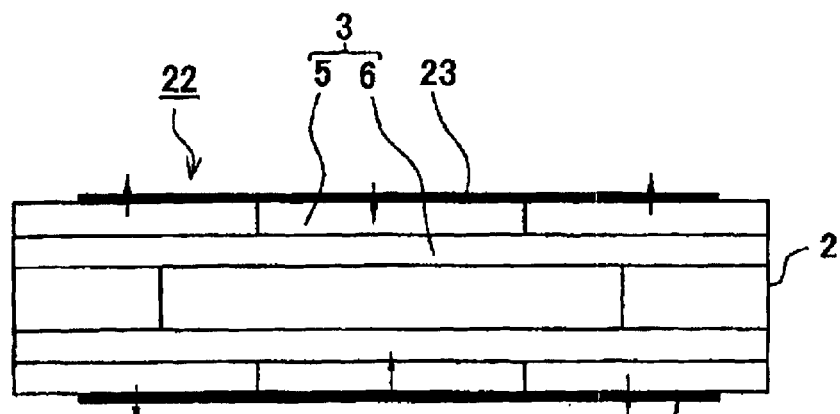
FIGS. 7A and 7B are top views showing the construction of a second modified example of the vibrator of the first preferred embodiment of the present invention.
Figure 7B:
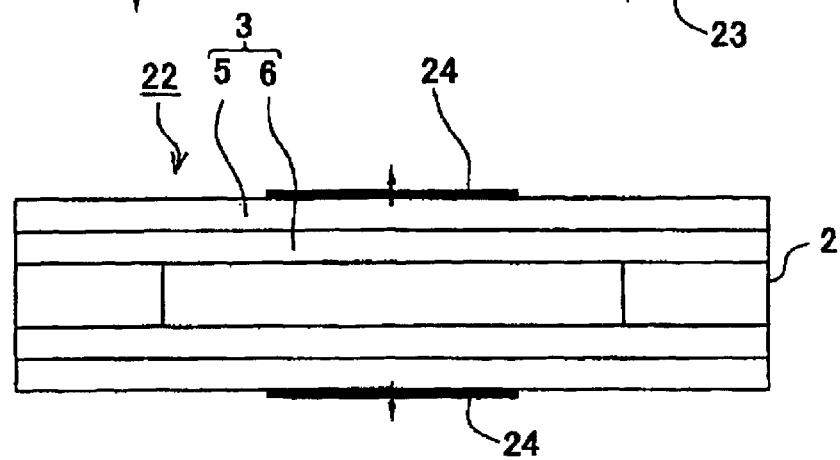
Figure 8:
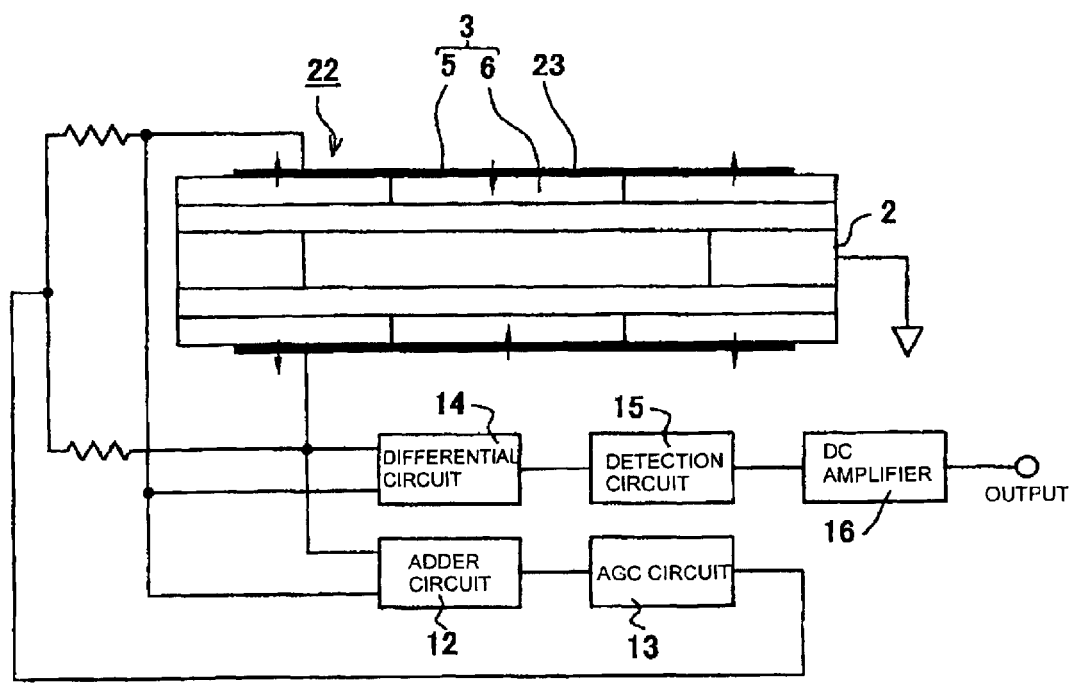
FIG. 8 shows the construction of the second modified example of the vibrator of the first preferred embodiment of the present invention, including a drive detection circuit.

The construction of essential parts, including a drive detection circuit, of the vibrating gyroscope 1 equipped with the vibrator 22 constructed as a second modified example, which is shown in FIG. 7A, is as shown in FIG. 8. Furthermore, in this case, as shown in FIG. 7B, a full-length electrode 24 may be disposed as a drive electrode or detection electrode, only in the middle portion of the outside surface of each piezoelectric ceramic plate 5 in which the whole area is polarized in the same direction.

Figure 9:
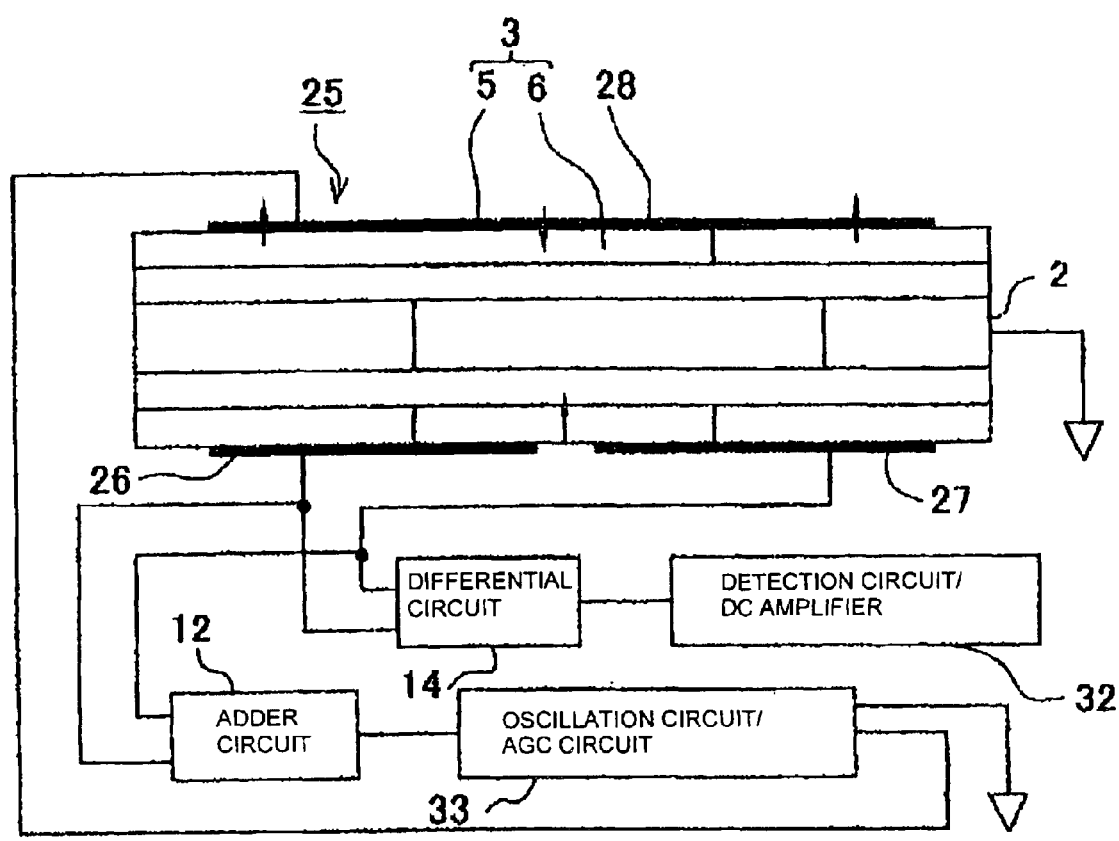
FIG. 9 shows the construction of a third modified example of the vibrator of the first preferred embodiment of the present invention, including a drive detection circuit.

Furthermore, in the vibrating gyroscope 1 according to the present preferred embodiment, a vibrating gyroscope 1 in which one vibrating body 3 is used for excitation and the other vibrating body 3 is used for detection may be constructed as a modified example. For example, a third modified example is shown in FIG. 9; the whole area of a piezoelectric ceramic plate 5 constituting the other vibrating body 3 with which a vibrator 25 is equipped is polarized in the same direction, a pair of detection electrodes 26 and 27 are disposed on the outside surface of the piezoelectric ceramic plate 5 so as to be separated from each other, and, under such conditions, the difference between detection signals is output from the detection electrodes 26 and 27. Moreover, the intermediate electrodes (not illustrated) of the vibrating bodies 3 in contact with the intermediate parts 2 may be set at a reference electric potential or made electrically floating.

That is, in the vibrator 25 constructed as a third modified example, the pair of detection electrodes 26 and 27 are disposed at one end and the other end in the longitudinal direction X on the outside surface of the other vibrating body 3 so as to be separated from each other. The signals due to buckling vibrations output from the detection electrodes 26 and 27 have the same phase because the polarization direction is the same as the bending direction in the piezoelectric ceramic plate 5. On the contrary, the signals due to secondary bending vibrations output from the detection electrodes 26 and 27 have opposite phases because the bending directions are opposite to each other although the polarization directions are the same, and the opposite-phase components of the signals due to secondary bending vibrations can be detected by the differential circuit 14 constituting the detector.

Figure 10:
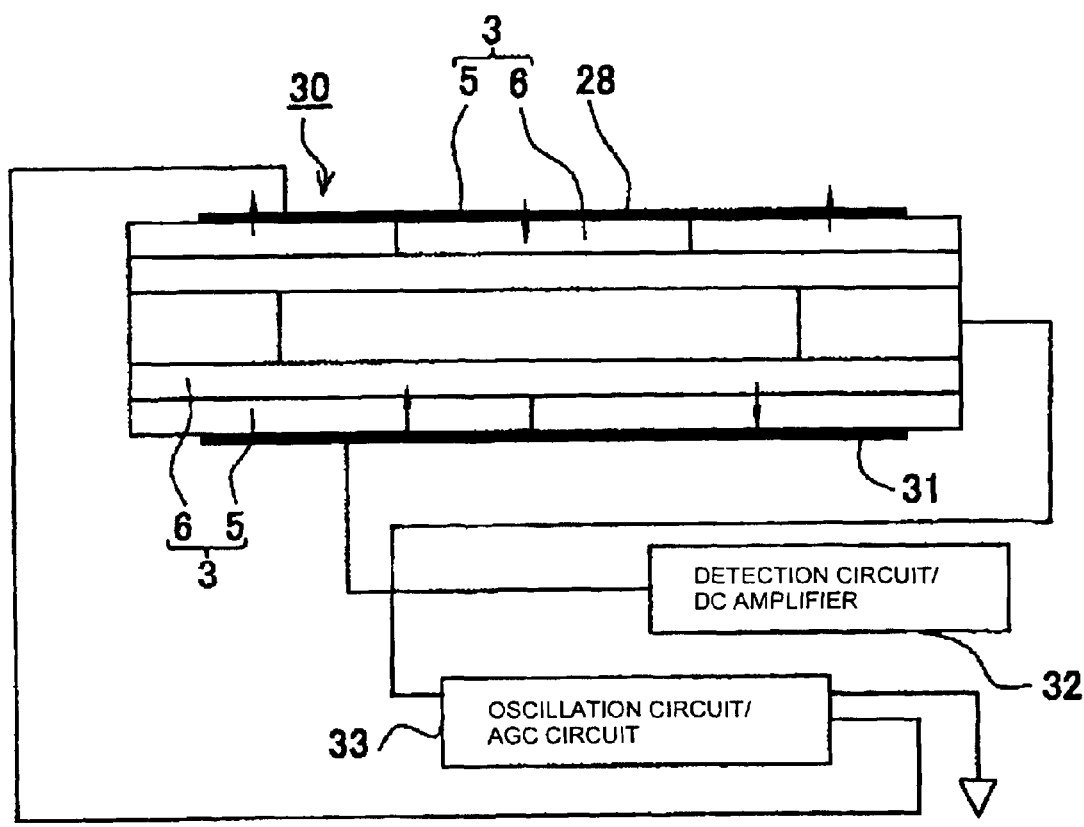
FIG. 10 shows the construction of a fourth modified example of the vibrator of the first preferred embodiment of the present invention, including a drive detection circuit.
Figure 11:
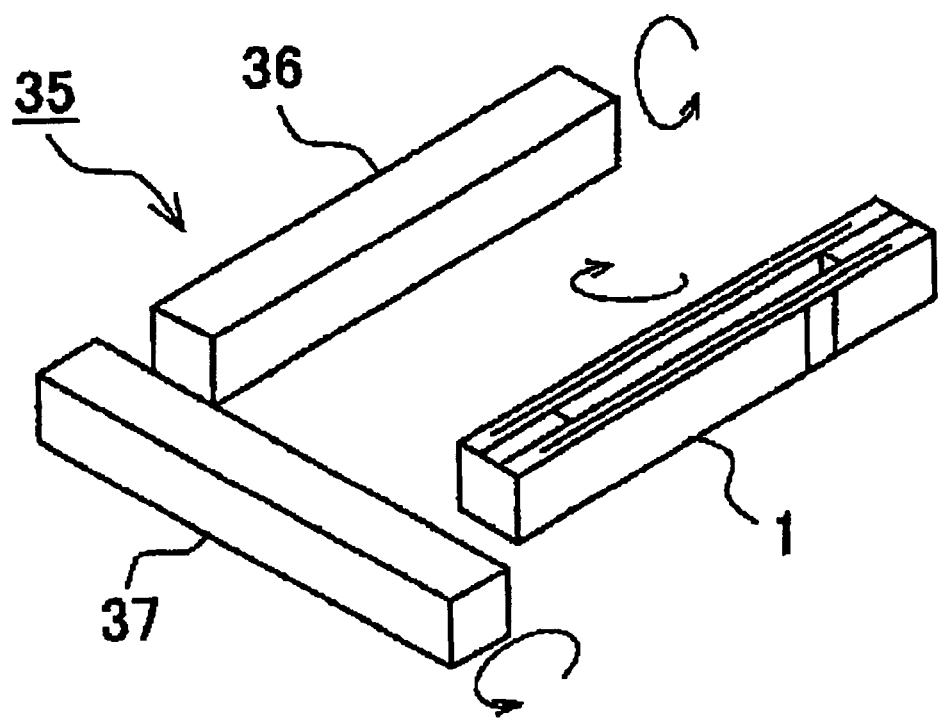
FIG. 11 shows the construction of essential parts of an angular velocity sensor equipped with the vibrating gyroscope of the first preferred embodiment of the present invention.

Furthermore, as a vibrating gyroscope 1 in which one vibrating body 3 is used for excitation and the other vibrating body 3 is used for detection, there is an example equipped with a vibrator 30 constructed as a fourth modified example, which is shown in FIG. 10. In the vibrator 30, the polarization direction is reversed in each area of substantially one half in the longitudinal direction X of the piezoelectric ceramic plate 5 constituting the other vibrating body 3. A full-length electrode 31 for detection is formed on the outside surface of the piezoelectric ceramic plate 5 on the other side, and, when constructed as a modified example like this, since the electrode construction is simple, the cost can be easily reduced.

In the vibrator 30, since the polarization direction is reversed in each area of substantially one half along the longitudinal direction X of the polarization ceramic plate 5 constituting the other vibrating body 3 and the full-length electrode 31 is arranged on the outside surface so as to extend from one end to the other end, the signals due to buckling vibrations have opposite phases at one end and the other end and accordingly, the signals cancel each other to output no signal. However, since the bending directions become opposite to each other at one end and the other end of the vibrator 30, the signals due to the secondary bending vibrations have the same phase, and accordingly, a signal is output from the full-length electrode 31 for detection.

Moreover, in the piezoelectric ceramic plate 5 constituting one vibrating body 3 in these third and fourth modified examples, the polarization direction is reversed in each area of substantially one third in the longitudinal direction and a full-length electrode 28 for driving is disposed on the outside surface. Furthermore, reference numeral 14 in FIG. 9 represents a differential circuit, reference numeral 32 in FIGS. 9 and 10 represents a detection circuit and DC amplifier, and reference numeral 33 represents an oscillation circuit and AGC circuit.

Furthermore, the vibrating gyroscope 1 according to the present preferred embodiment is used, when an angular velocity sensor 35 used in navigation systems and auto body control systems in automobiles or for correcting video camera vibrations due to shaking of a user's hands, that is, an angular velocity sensor 35 in which the three vibrating gyroscopes 1, 36, and 37 are provided on the same flat surface as shown in FIG. 11, is constructed. That is, the two vibrating gyroscopes 36 and 37 contained in the angular velocity sensor 35 are arranged to detect rotational angular velocities applied around the two axes that are substantially perpendicular to each other provided on the flat surface, that is, the detection axes corresponding to the longitudinal directions, in the same way as before.

On the contrary, the vibrating gyroscope 1 provided on the same surface as the vibrating gyroscopes 36 and 37 and detecting a rotational angular velocity acting about the vertical axis that is substantially perpendicular to the surface is constructed as described in the first preferred embodiment. Since the rotational angular velocity acting about the vertical axis that is substantially perpendicular to the mounting surface is detected by the vibrating gyroscope 1, the angular velocity sensor 35 having such an overall construction manages without using vibrating gyroscopes similar to the vibrating gyroscopes 36 and 37, which detect a rotational angular velocity acting about the detection axis that is substantially parallel to the longitudinal direction. As a result, a reduction in height becomes possible.

The inventor of the present invention has filed a patent application of an invention disclosed in U.S. Pat. No. 6,281,618, and it is already disclosed that, when the construction of two bending plates, the end portions of which are fixed to each other and which contain an empty portion or gap therebetween is adopted, the rotational angular velocities acting around the two axes which are substantially parallel to the vibrator and substantially perpendicular to each other can be detected. However, the previous invention only shows that the rotational angular velocities acting about two detection axes which are substantially parallel to the vibrator and substantially perpendicular to each other can be detected. The present invention, in which a rotational angular velocity acting about the axis that is substantially perpendicular to the vibrator 4 of the vibrating gyroscope 1 arranged so as to be substantially parallel to the mounting board 11, that is, about the vertical axis to the mounting surface, is detected, is different in construction and operation.

Second Preferred Embodiment

Figure 12:
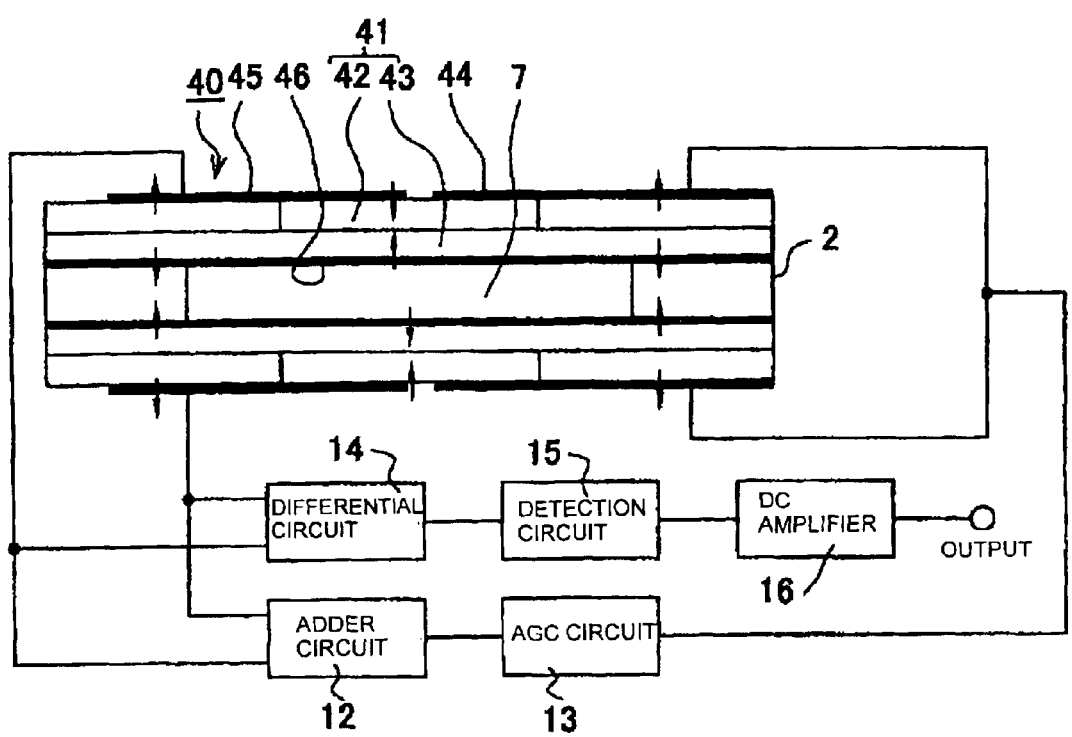
FIG. 12 shows the construction of essential parts, including a drive detection circuit, of a vibrating gyroscope according to a second preferred embodiment of the present invention.
Figure 13:
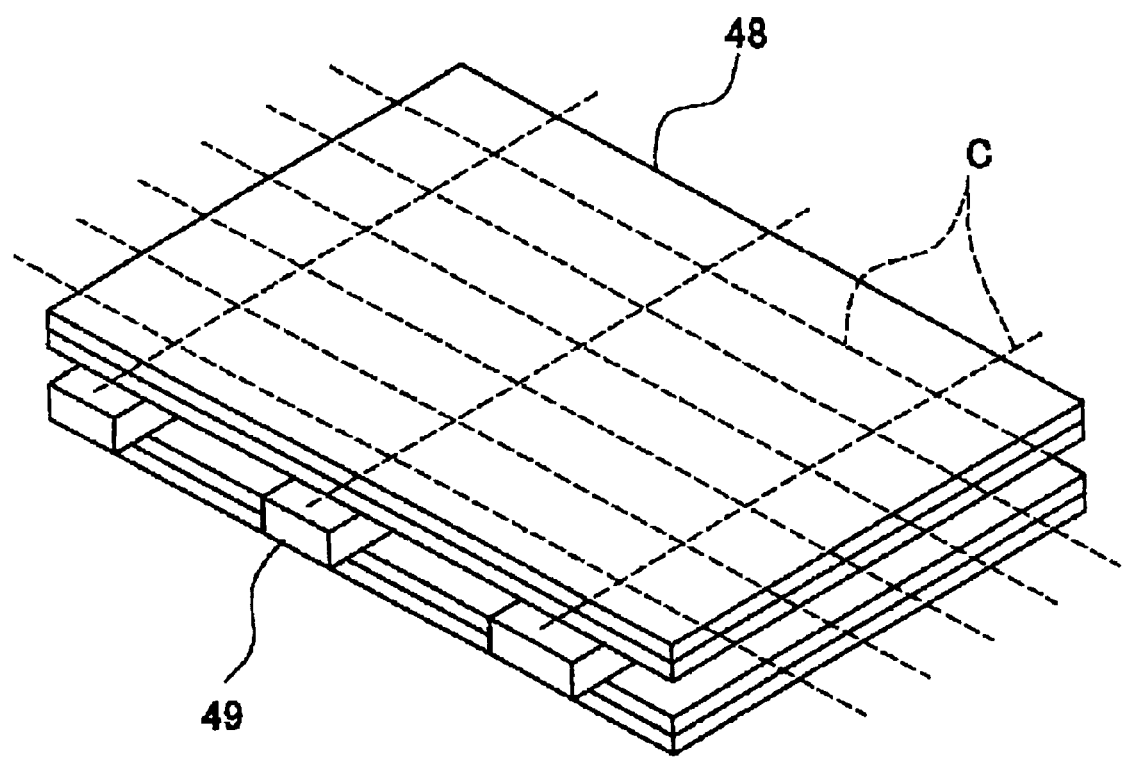
FIG. 13 is to describe the manufacturing process of a vibrator.

FIG. 12 shows the construction of essential parts, including a drive detection circuit, of a vibrating gyroscope according to a second preferred embodiment of the present invention, FIG. 13 shows the manufacturing process of a vibrator, and FIGS. 14 to 18 show the construction of first to fifth modified examples of the vibrating gyroscope according to the second preferred embodiment of the present invention.

Since the whole construction of the vibrating gyroscope of the second preferred embodiment is basically the same as the vibrating gyroscope of the first preferred embodiment shown in FIG. 1 except that each vibrating body 41 constituting a vibrator 40 has a bimorph construction, a detailed description is omitted. Moreover, when the description is required, in FIGS. 12 to 18, the same reference numerals are used to indicate the same or equivalent parts and portions in FIGS. 1 to 11.

The vibrating gyroscope according to the present preferred embodiment includes a vibrator 40 having a pair of vibrating bodies 41, each having a substantially rectangular plate shape, in which both end portions in the longitudinal direction X are fixed by intermediate metal parts 2 and the middle portions face each other. Each of the vibrating bodies 41 preferably has a bi-morph construction in which the polarization direction (shown by arrows in the drawing) in each area of substantially one third along the longitudinal direction X is reversed and a pair of piezoelectric ceramic plates 42 and 43 having polarization directions opposite to each other are joined so as to face each other.

That is, both end portions of the vibrating bodies 41 in the longitudinal direction X are fixed by the intermediate parts 2, and a drive electrode 44 and a detection electrode 45 are disposed on the outside surface of each piezoelectric ceramic plate 42 disposed at the outer position of the vibrator 40 at one end and the other end in the longitudinal direction X so as to be separated. On the other hand, a full-length electrode 46 is arranged as a middle electrode on the outside surface of each piezoelectric ceramic plate 43 disposed at the inner portion of the vibrator 40. Moreover, these full-length electrodes 46 are in contact with the intermediate parts 2 and have the same electric potential, and are made electrically floating. It is a matter of course that the full-length electrodes 46 may be connected to a reference electric potential.

An empty portion or gap 7 is provided between the middle portions of the piezoelectric ceramic plates 43 disposed at the inner portion of the vibrator 40 such that the buckling vibrations of the vibrating bodies 3, that is, the buckling vibrations, which are in the thickness direction Y, but opposite to each other, of the vibrating bodies 41, are made possible.

When the vibrator 40 is constructed this way, that is, when the vibrator 40 is constructed such that the vibrating bodies 41 of a bimorph construction are disposed so as to face each other, as in an intermediate manufacturing process shown in FIG. 13, a semi-finished product 48 having many vibrators 40 is first prepared and, when this semi-finished product 48 is cut along the cutting lines, many vibrators 40 can be produced in one batch, which offers an advantage. Moreover, an intermediate part 49 may be integrally formed by cutting one side portion of a part from which one vibrating body 41 is produced.

Furthermore, the vibrator 40, in which the vibrating bodies 41 of a bimorph construction are disposed so as to face each other, is constructed such that secondary bending vibrations with both ends free in the thickness direction Y of the vibrating bodies 41 are possible as a whole. That is, it is made possible to detect a rotational angular velocity acting around an axis (detection axis) in the width direction Z of each vibrating body 41. The vibrator 40 is supported in the vicinity of the nodal points located at both end portions out of three nodal points of the secondary bending vibrations existing along the longitudinal direction X on the mounting board. Moreover, the resonance frequency of the secondary bending vibration in this case is preferably close to the frequency of the buckling vibration.

Moreover, the adder circuit 12 and the AGC circuit 13 which make the vibrating bodies perform buckling vibrations in opposite directions and which function as a driver for the vibrator 40 and the differential circuit 14, the detection circuit 15, and the DC amplifier 16, which function as a detector for detecting the amplitude of secondary bending vibrations, are provided on the surface of the mounting board where the vibrator 40 is mounted. Then, the AGC circuit 13, functioning as a driver, is connected to the drive electrode 44 for each vibrating body 41, the adder circuit 12 and the differential circuit 14 are connected to the detection electrode 45 of each vibrating body 41, and a signal in proportion to the magnitude of the detected secondary bending vibration is output from the DC amplifier 16.

Since the vibrating gyroscope according to the second preferred embodiment is constructed as described above, it acts in the same way as the vibrating gyroscope 1 according to the first preferred embodiment, and accordingly, the vibrating gyroscope shows the same function. The vibrating gyroscope according to the present preferred embodiment may be variously altered, as in first to fifth modified examples described below.

Figure 14:
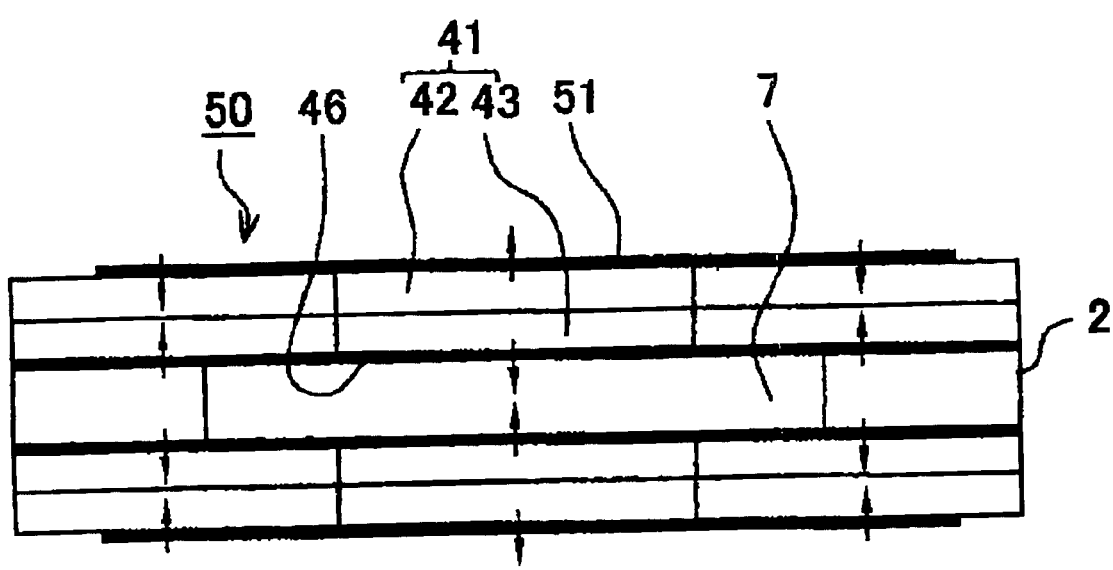
FIG. 14 shows the construction of a first modified example of the vibrator of the second preferred embodiment of the present invention.
Figure 15:
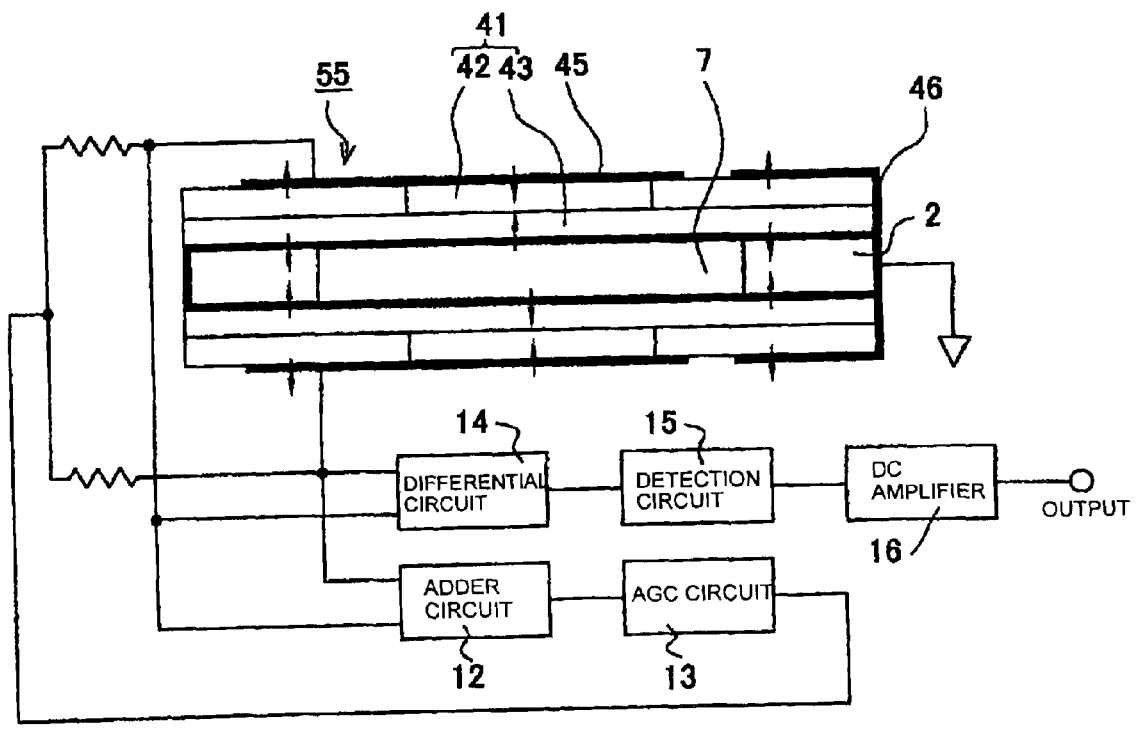
FIG. 15 shows the construction of a second modified example of the vibrator of the second preferred embodiment, including a drive detection circuit.

First, in each of the vibrating bodies 41 according to the present preferred embodiment, the drive electrode 44 and the detection electrode 45 are disposed on the outside surface of the piezoelectric ceramic plate 42 disposed at the outer position, but, as in a vibrator 50 constructed as a first modified example shown in FIG. 14, a full-length electrode 51 for driving and detection may be provided. Furthermore, as in a vibrator 55 constructed as a second modified example shown in FIG. 15, the full-length electrode 46 arranged as the intermediate electrode on the outside surface of the piezoelectric ceramic plate 43 disposed at the inner position is extended to reach the outside surface of the piezoelectric ceramic plate 42 disposed at the outer position and may be set at a reference electric potential for driving.

Figure 16:
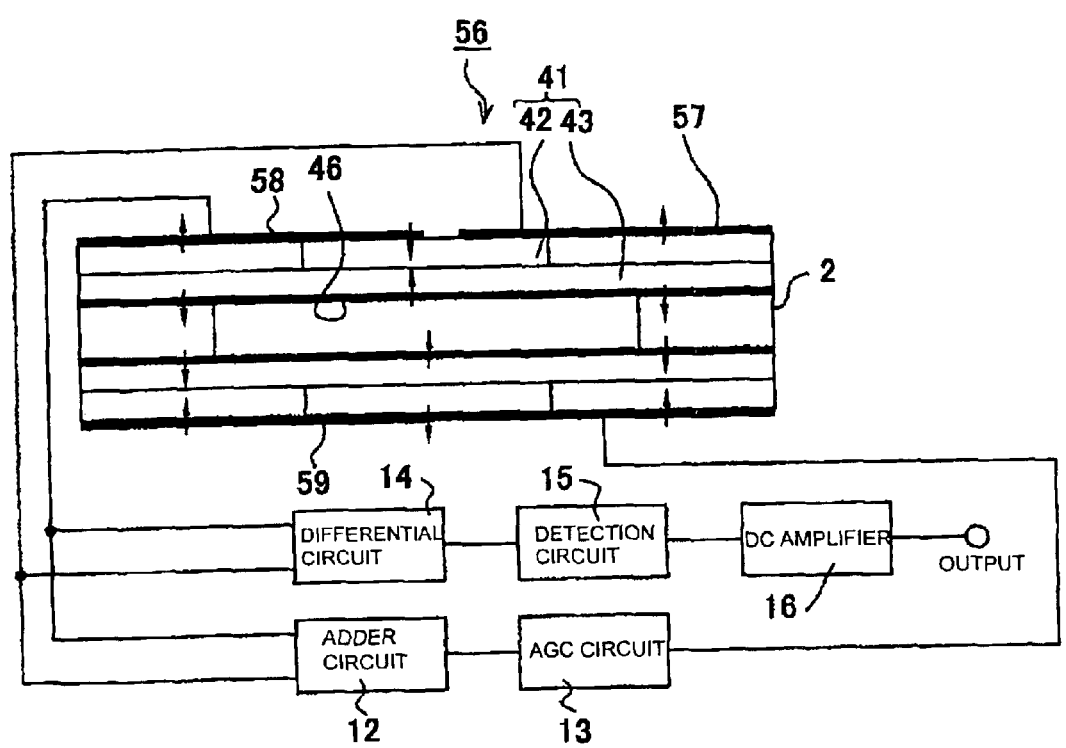
FIG. 16 shows the construction of a third modified example of the vibrator of the second preferred embodiment, including a drive detection circuit.

Furthermore, as in a vibrator 56 constructed as a third modified example shown in FIG. 16, the polarization direction of each piezoelectric ceramic plate 42 positioned on the outside is made the same, a pair of detection electrodes 57 and 58 are provided on the outside surface of one piezoelectric ceramic plate 42 at one end and the other end in the longitudinal direction X so as to be separated from each other, and a full-length electrode 59 for driving may be disposed on the outside surface of the other piezoelectric ceramic plate 42. The intermediate electrode 46 in contact with the intermediate part 2 has the same electric potential as the intermediate part 2, and is electrically floating.

Figure 17:
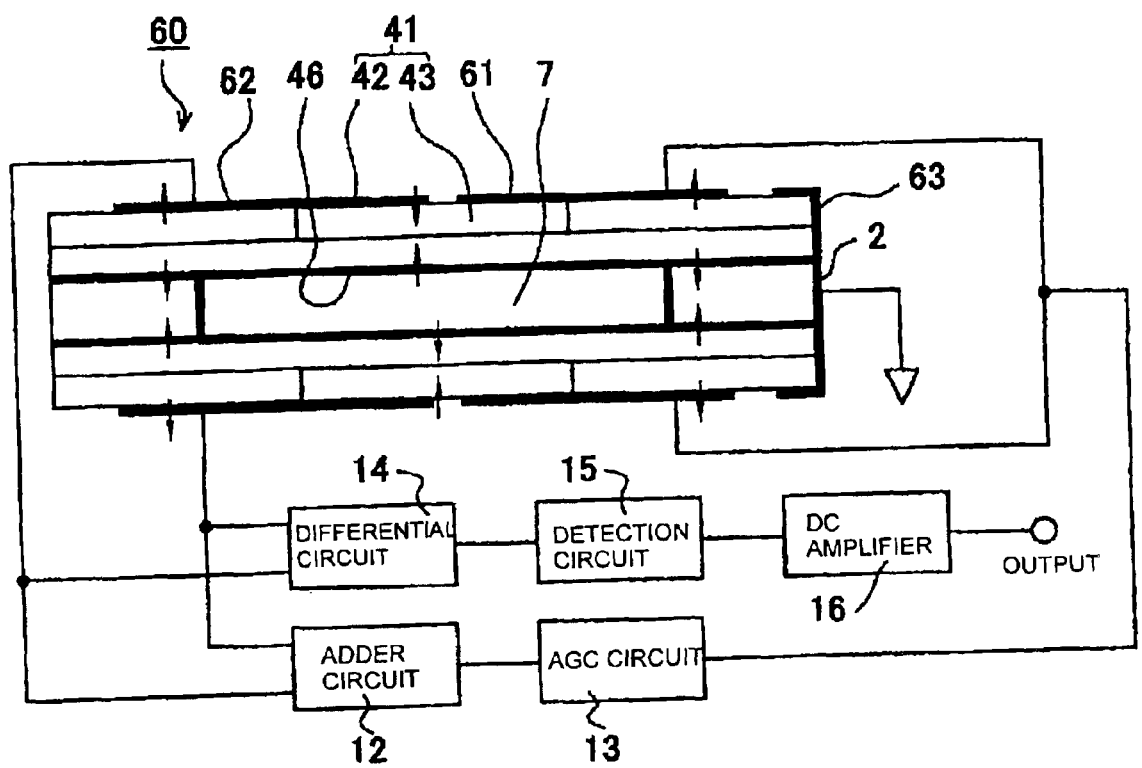
FIG. 17 shows the construction of a fourth modified example of the vibrator of the second preferred embodiment, including a drive detection circuit.
Figure 18:
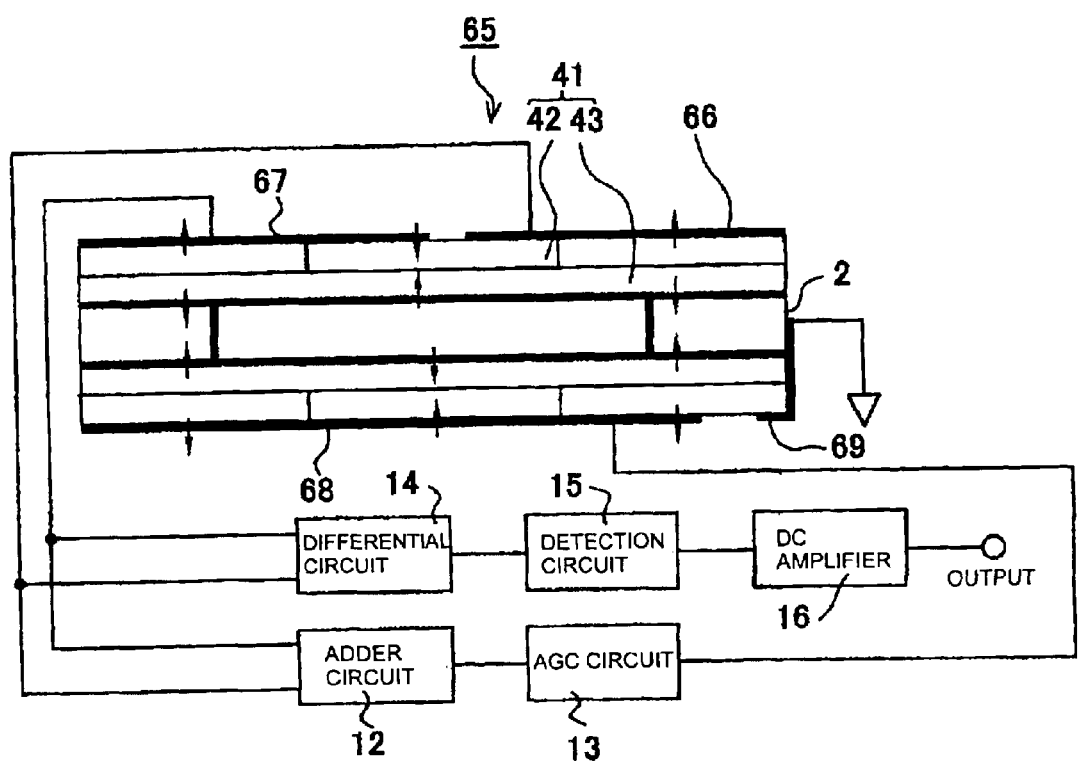
FIG. 18 shows the construction of a fifth modified example of the vibrator of the second preferred embodiment, including a drive detection circuit.

Moreover, as in a vibrator 60 constructed as a fourth modified example shown in FIG. 17, a drive electrode 61 and a detection electrode 62 are disposed on the outside surface of the piezoelectric ceramic plate 42 disposed at the outer position at one end and the other end in the longitudinal direction X so as to be separated from each other, and an end face electrode 63 may be disposed on one end surface of the vibrator 60. Or, as in a vibrator 65 constructed as a fifth modified example shown in FIG. 18, a pair of detection electrodes 66 and 67 are disposed on the outside surface of the piezoelectric ceramic plate 42 constituting one vibrating body 41 so as to be separated from each other, a full-length electrode 68 for driving is disposed on the outside surface of the piezoelectric ceramic plate 42 constituting the other vibrating body 41, and an end surface electrode 69 may be provided on one end surface of the vibrator 65.

In the vibrating gyroscopes constructed as the fourth and fifth modified examples, the polarization directions of the piezoelectric ceramic plates 42 positioned at the outer side are opposite to each other, the intermediate electrode 46 in contact with the intermediate part 2 has the same electric potential and is made conductive, and the intermediate electrode 46 is connected to a reference electric potential or an inverse signal of the driving voltage is supplied. Moreover, when the vibrating gyroscope according to the second preferred embodiment described above is used, the same angular velocity sensor 35 as in the case of the first preferred embodiment can be constructed.

A vibrating gyroscope according to various preferred embodiments of the present invention preferably includes a pair of vibrating bodies, each preferably having the shape of a substantially rectangular plate, and is equipped with a vibrator in which secondary bending vibrations with both ends free are possible in the thickness direction of the vibrating bodies as a whole. In this case, the resonance frequency of secondary bending vibrations is close to the resonance frequency of buckling vibrations.

In the vibrating gyroscope, it becomes possible to detect the rotational angular velocity acting about the detection axis that is substantially parallel to the width direction of each vibrating body, that is, the detection axis that is substantially perpendicular to the plane where the vibrator is provided, and accordingly, the height of the vibrator in the direction that is substantially parallel to the detection axis can be reduced. Therefore, it is easy to reduce the height of the vibrating gyroscope, and as a result, the vibrating gyroscope can be effectively prevented from protruding above other electronic parts provided on a plane.

In an angular velocity sensor according to various preferred embodiments of the present invention, two out of three vibrating gyroscopes provided on the same plane detect rotational angular velocities acting about axes that are substantially parallel to the longitudinal direction, and the other vibrating gyroscope detects a rotational angular velocity acting about the vertical axis that is substantially perpendicular to the plane. Because the height of the other vibrating gyroscope is reduced, the height of the angular velocity sensor itself is reduced, and accordingly, the angular velocity sensor can be effectively prevented from protruding above other electronic parts.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A vibrating gyroscope comprising:
   a substrate;
   a vibrator including at least a pair of vibrating bodies, in which both end portions in a longitudinal direction are fixed together in the width direction by intermediate parts, and the vibrator is constructed such that a secondary bending vibration with both ends movable in a thickness direction of the vibrating bodies is generated;
   a driver making the vibrating bodies generate buckling vibrations in opposite directions relative to each other; and
   a detector for detecting the magnitude of the secondary bending vibration of the vibrator; wherein
   the resonance frequency of the secondary bending vibration is close to the resonance frequency of the buckling vibration; and
   the vibrator is arranged such that major surfaces of the at least a pair of vibrating bodies extend in a plane that is substantially perpendicular to a major surface of the substrate.

2. A vibrating gyroscope as claimed in claim 1, wherein the vibrating bodies have a substantially rectangular plate shape.

3. A vibrating gyroscope as claimed in claim 1, wherein three nodal points of the secondary bending vibration exist along the longitudinal direction of the vibrator and, out of the three nodal points, the vibrator is supported at the two nodal points located at the ends of the vibrator.

4. A vibrating gyroscope as claimed in claim 1, wherein the vibrating bodies have a unimorph construction.

5. A vibrating gyroscope as claimed in claim 1, wherein the vibrating bodies have a bimorph Construction.

6. A vibrating gyroscope as claimed in claim 1, wherein electrodes are disposed on the outside surface of each of the vibrating bodies so as to be disposed opposite to each other with the vibrator disposed therebetween, and the magnitude of the secondary bending vibration is detected through the electrodes.

7. A vibrating gyroscope as claimed in claim 1, wherein a pair of electrodes are disposed on the outside surface of one of the vibrating bodies so as to be separated from each other in the longitudinal direction and an additional electrode is disposed along substantially an entire length of the vibrator on the outside surface of another of the vibrating bodies and opposite to the pair of electrodes, and the magnitude of the secondary bending vibration is detected through the electrodes.

8. A vibrating gyroscope as claimed in claim 1, wherein electrodes are disposed along substantially an entire length of the vibrator on the outside surface of each of the vibrating bodies so as to be opposed to each other with the vibrator disposed therebetween and the magnitude of the secondary bending vibration is detected through the electrodes.

9. A vibrating gyroscope as claimed in claim 1, wherein the intermediate parts are metal members disposed between the vibrating bodies.

10. A vibrating gyroscope as claimed in claim 1, wherein a drive electrode and a detection electrode are disposed on the outside surface of each of the vibrating bodies.

11. A vibrating gyroscope as claimed in claim 1, wherein the driver includes a drive electrode and the detector includes a detection electrode, each of the drive electrode and the detection electrode extends along less than an entire length of the vibrating bodies.

12. A vibrating gyroscope as claimed in claim 1, wherein the driver includes a drive electrode and the detector includes a detection electrode, each of the drive electrode and the detection electrode extends along an entire length of the vibrating bodies.

13. A vibrating gyroscope as claimed in claim 1, further comprising supporting parts arranged to support the vibrating bodies above a mounting board and to electrically connect the vibrator to electrodes provided on the mounting board.

14. A vibrating gyroscope as claimed in claim 1, wherein the driver includes an adder circuit and an automatic gain control circuit.

15. A vibrating gyroscope as claimed in claim 1, wherein the detector includes a differential circuit, a detection circuit, and a direct current amplifier.

16. A vibrating gyroscope as claimed in claim 1, wherein each of the vibrating bodies have at least two portions which are oppositely polarized.

17. A vibrating gyroscope as claimed in claim 1, wherein at least one of the vibrating bodies is uniformly polarized along an entire length thereof.

18. A vibrating gyroscope as claimed in claim 1, wherein one of the vibrating bodies is an excitation vibration body and another of the vibrating bodies is a detection vibrating body.

19. An angular velocity sensor comprising a plurality of vibrating gyroscopes provided on the same plane, wherein one of the plurality of vibrating gyroscope is arranged to detect a rotating angular velocity having a vertical axis that is substantially perpendicular to the plane as a rotating axis and is a vibrating gyroscope as claimed in claim 1.

20. An angular velocity sensor as claimed in claim 19, wherein three of the vibrating gyroscopes are provided and disposed on the same plane.

* * * * *